(12) United States Patent
Johnson et al.

(10) Patent No.: US 12,238,098 B1
(45) Date of Patent: Feb. 25, 2025

(54) SYSTEM FOR CROSS-DOMAIN IDENTITY MANAGEMENT (SCIM) PROXY SERVICE

(71) Applicant: CLOUDFLARE, INC., San Francisco, CA (US)

(72) Inventors: Kenny Johnson, Austin, TX (US); Gabriel Andrew Bauman, New Westminster (CA); Kyle Hiller, Brooklyn, NY (US); Alexander Jay Holland, Ann Arbor, MI (US); Russell Louis Kerns, Austin, TX (US); Jesse Li, New York, NY (US); James Howard Royal, Austin, TX (US); Akemi Leigh Davisson, Round Rock, TX (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 18/809,098

(22) Filed: Aug. 19, 2024

(51) Int. Cl.
*H04L 9/40* (2022.01)
*G06F 21/62* (2013.01)

(52) U.S. Cl.
CPC ...... *H04L 63/0884* (2013.01); *G06F 21/6272* (2013.01); *H04L 63/10* (2013.01)

(58) Field of Classification Search
CPC .. H04L 63/0884; H04L 63/10; G06F 21/6272
See application file for complete search history.

(56) References Cited

U.S. PATENT DOCUMENTS

| 8,943,140 | B1 * | 1/2015 | Kothari | G06Q 10/1095 709/219 |
| 2020/0145499 | A1 * | 5/2020 | Kaplan | G06F 16/9538 |

OTHER PUBLICATIONS

Johnson et al., Announcing SCIM support for Cloudflare Access & Gateway, The Cloudflare Blog, Jan. 12, 2023, 11 pages, downloaded at: https://blog.cloudflare.com/access-and-gateway-with-scim.
Li, et al., System for Cross-domain Identity Management: Definitions, Overview, Concepts, and Requirements, Internet Engineering Task Force (IETF), Request for Comments: 7642, Sep. 2015, 19 pages.

(Continued)

*Primary Examiner* — Huan V Doan
(74) *Attorney, Agent, or Firm* — NICHOLSON DE VOS WEBSTER & ELLIOTT LLP

(57) ABSTRACT

A system for cross-domain identity management (SCIM) proxy service is described. A first SCIM endpoint receives, from a first SCIM client, a first message that includes a SCIM resource. The first SCIM endpoint is associated with a customer of the SCIM proxy service. The SCIM proxy service is configured as a first SCIM service provider for the first SCIM client. The first message is validated. The first SCIM proxy service determines that a third-party application is in scope for the SCIM resource, where the SCIM proxy service is configured as a second SCIM client for the third-party application. The SCIM proxy service transforms the SCIM resource to create a transformed SCIM resource that is applicable for the third-party application. The SCIM proxy service transmits a second message to a second SCIM endpoint of the third-party application, the second message including the transformed SCIM resource.

21 Claims, 8 Drawing Sheets

(56) References Cited

OTHER PUBLICATIONS

Hunt, et al., System for Cross-domain Identity Management: Core Schema, Internet Engineering Task Force (IETF), Request for Comments: 7643, Sep. 2015, 104 pages.

Hunt, et al., System for Cross-domain Identity Management: Protocol, Internet Engineering Task Force (IETF), Request for Comments: 7644, Sep. 2015, 89 pages.

* cited by examiner

SYSTEM FOR CROSS-DOMAIN IDENTITY MANAGEMENT (SCIM) PROXY SERVICE

FIELD

Embodiments of the invention relate to the field of cloud computing; and more specifically, to a System for Cross-Domain Identity Management (SCIM) proxy service.

BACKGROUND

Sharing identity across multiple partners or contractors is cumbersome and prone to errors. For instance, if an internal organization has an application that is to be shared with an external party (e.g., partner, contractor), the internal organization and the external party need to agree on a source of identity.

One way is for the internal organization to onboard the external party to their own identity provider. Although this gives the internal organization control of identity, it also adds overhead in terms of time and cost. For instance, the internal organization may spend time instructing the external party to sign-up and learn the tool and may have to pay for additional seat licenses (even if just temporary) for the external party. Also, the external party typically has another password to manage for access to the internal resources. The overhead increases as the number of parties increases.

Another way is to federate the identity. The internal organization may connect their own directory service to the external party's equivalent service, and administrators merge the two services together to trust each other. The external party may login using their own credentials. Although this way avoids introducing new passwords, both organizations must dedicate time integrating their identity providers; and some identity providers may not be integrated. Federation is typically only available for large entities, making it unavailable to single users or freelancers.

Some internet security solutions can provide security for a hosted internal application where the authoritative DNS for that application is changed to the internet security service. All DNS queries and HTTP requests then flow through that internet security service, which can then enforce rules for each HTTP request for that application. However, remote applications, such as SaaS applications, are typically provided as a third-party service where control over how those remote applications are reached is dependent on that third-party service. The access control to these remote applications depends on the third-party service and can vary greatly depending on the remote application. For example, some may allow for rules based on location or device rules, whereas others do not. Also, logging and permissions vary across the remote applications. Some allow for very granular logging capabilities whereas others may have non-existent controls and logging.

As the number of users and applications increase for an organization, the complexity and criticality of permission management expands significantly. Adopting Single Sign On (SSO), allows users to have a single username/password across all of their applications instead of a unique username/password combination per application. It also allows security administrators to centrally control who has access to particular applications. SSO works to authenticate a user to a specific application, however the user must exist in that application. Users can be manually provisioned in the application, use a just-in-time provisioning, or use System for Cross-Domain Identity Management (SCIM) for provisioning. Manually provisioning users is error prone and cumbersome. Just-In-Time provisioning can lead to too many seats and/or overprovisioning users.

SCIM, which is defined in Internet Engineering Task Force (IETF) Request for Comments (RFCs) 7642, 7643, and 7644, is an open standard protocol designed to simplify the process of provisioning user identities between identity providers and applications. SCIM enables identity providers to exchange user identity information with applications in a standardized way. The SCIM standard defines a set of REST APIs that allow identity providers to communicate with service providers, as well as a data model that defines the types of user information that can be exchanged. These APIs are typically a/Users and/Groups API which dictate which users and groups are sent to an application. The information sent via the/Users &/Groups endpoints will vary depending on the application. Each application can require different attributes to be sent to properly provision a user and set their appropriate permissions. Once properly configured, SCIM automatically grants a user access to all the applications once they have been added to the identity provider. This saves IT teams hours of dealing with access requests and manually creating users while they onboard to a business. It also automates user deprovisioning in the event of an employee termination or a security breach.

SUMMARY

A system for cross-domain identity management (SCIM) proxy service is described. A first SCIM endpoint receives, from a first SCIM client, a first message that includes a SCIM resource. The first SCIM endpoint is associated with a customer of the SCIM proxy service. The SCIM proxy service is configured as a first SCIM service provider for the first SCIM client. The first message is validated. The first SCIM proxy service determines that a third-party application is in scope for the SCIM resource, where the SCIM proxy service is configured as a second SCIM client for the third-party application. The SCIM proxy service transforms the SCIM resource to create a transformed SCIM resource that is applicable for the third-party application. The SCIM proxy service transmits a second message to a second SCIM endpoint of the third-party application, the second message including the transformed SCIM resource.

BRIEF DESCRIPTION OF THE DRAWINGS

The invention may best be understood by referring to the following description and accompanying drawings that are used to illustrate embodiments. In the drawings.

DESCRIPTION OF EMBODIMENTS

Figure 1:
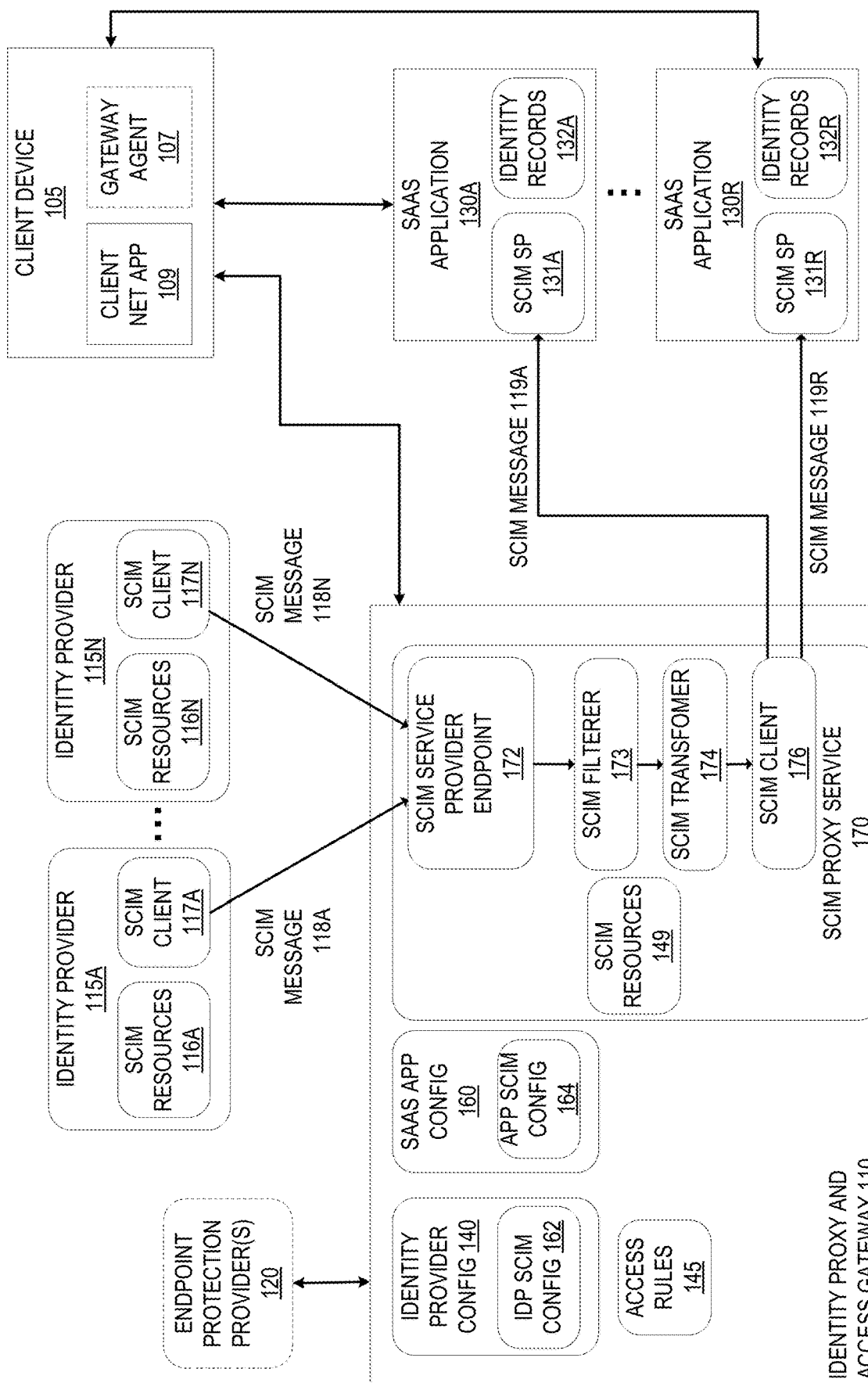
FIG. 1 shows an example of a SCIM proxy service that is part of an identity proxy and access gateway according to an embodiment.

A SCIM proxy service is described herein. The SCIM proxy service receives SCIM resources from an authoritative source (e.g., one or more identity providers), can transform the resources, and sends the resources to one or more target SaaS applications. This simplifies the provisioning and deprovisioning of accounts across the one or more target SaaS applications. The SCIM proxy service allows customers to define transformations for the resources such as mapping, renaming, adding custom fields, to ensure that the data from the authoritative source is transformed into a particular format for a target SaaS application.

In an embodiment, the SCIM proxy service is part of an identity proxy and access gateway. The identity proxy and access gateway proxies between multiple identity providers and multiple SaaS applications. When a user is logging into a SaaS application, the user can be presented with identity provider options of the identity providers. For instance, the user may select to provide identity (e.g., provide login credentials) to one of the identity providers that are presented. Each identity provider may have their own requirements and/or rules that must be followed to prove identity, such as requiring multifactor authentication, etc. If a user successfully proves identity with one of the identity providers, that identity provider shares the user identity and optionally other metadata with the identity proxy and access gateway.

The identity proxy and access gateway allows customers to define requirements for accessing a resource and/or application of a SaaS application. These requirements are in addition to any requirement set by the identity provider(s) and/or the SaaS application(s). These requirements may be based on identity-based access rules and/or non-identity based access rules. For instance, an identity-based access rule may define email addresses or groups of email addresses that are allowed and/or not allowed to access the resource or SaaS application. A non-identity access rule is an access rule that is not based on identity of the user such as location (e.g., geographic region such as the country of origin), device posture, time of request, type of request, IP address, multifactor authentication status, multifactor authentication type, type of device, type of client network application, whether the request is associated with a gateway agent on the client device, and/or other layer 3, layer 4, and/or layer 7 (of the Open Systems Interconnection (OSI) model) policies. When a user attempts to connect to the SaaS application and/or a resource of the SaaS application, the identity proxy and access gateway enforces the applicable rule(s). The identity proxy and access gateway allows the user to access the SaaS application only if the criteria are met.

In an embodiment, the SaaS application is configured to only allow traffic for the customer through the identity proxy and access gateway. The client devices can be configured to transmit traffic for a SaaS application through the identity proxy and access gateway. For instance, the client device may have an agent that intercepts all outgoing internet traffic to the SaaS application and transmits that traffic to the identity proxy and access gateway. The identity proxy and access gateway may enforce the access rule(s) on each request or connection to the SaaS application, which may include that requesting client devices are using a compliant agent. As an example, a customer may define a rule where if a certain keyword or path is in the requested URL, only certain user(s) can access the corresponding page. As another example, a customer may define a rule where if a certain keyword or other asset is included in the requested content, only certain user(s) can access the corresponding page and/or asset (e.g., sensitive data may be prevented from appearing on a page). The identity proxy and access gateway may also log each connection and/or request to the SaaS application. This allows for visibility, logging, and/or control over a user within the SaaS application.

FIG. 1 shows an example of a SCIM proxy service that is part of an identity proxy and access gateway according to an embodiment. The SCIM proxy service includes the identity proxy and access gateway 110, one or more identity providers 115A-N, the endpoint protection provider(s) 120, and one or more SaaS applications 130A-R. Traffic from client devices, such as the client device 105, can use the identity proxy and access gateway 110 such as when requesting access to resources of the SaaS applications 130A-R.

The identity proxy and access gateway 110 executes on one or more servers. The identity proxy and access gateway 110 may be provided by a cloud computing network. The cloud computing network includes multiple data centers that each include multiple servers, respectively. Each of these servers and/or data centers may execute an instance of the identity proxy and access gateway 110.

The identity proxy and access gateway 110 proxies between one or more identity providers 115A-N and one or more SaaS applications 130A-R. The customer configures at least one identity provider 115 using the identity provider configuration 140. For example, using the identity provider configuration 140, the customer configures the application identifier (sometimes called the client identifier) and a client secret (sometimes called an application secret). The customer also configures the identity provider itself with a redirect URL (sometimes called a callback URL) to the identity proxy and access service. When a user (represented by the client device 105) visits one of the SaaS applications 130A-R and proof of identity is requested (e.g., the user is logging into the SaaS application), the user can be presented with the configured identity provider options or redirected to a particular identity provider. The user can select one of the identity provider options and get redirected to that identity provider to prove identity. Each of the identity providers 115A-N may each have their own requirements or rules that must be followed to prove identity. For instance, a first identity provider may be configured to require multifactor authentication and a second identity provider may not. If the user successfully proves identity with one of the identity providers 115A-N (e.g., the user successfully logged into the selected identity provider), that identity provider shares the user identity and optionally other metadata with the identity proxy and access gateway 110.

The identity proxy and access gateway 110 provides a SCIM proxy service 170. As part of configuring an identity provider, the customer can use the IDP SCIM configuration 162 for provisioning a SCIM connection to that identity provider. With this connection, the identity provider is a SCIM client and the SCIM proxy service is a SCIM service provider. The customer also configures the identity provider itself to provision the SCIM connection to the SCIM proxy service 170, which can include setting a credential type such as a bearer token and a URL for the SCIM endpoint of the SCIM proxy service 170. Multiple identity providers 115A-N may be configured as SCIM clients for a particular customer. In such a case, the customer configures each separate identity provider for SCIM provisioning. As shown in FIG. 1, the identity providers 115A-N include the SCIM resources 116A-N and SCIM clients 117A-N, respectively. The SCIM endpoint of the SCIM proxy service is represented by the SCIM service provider endpoint 172 of the SCIM proxy service 170. Once provisioned, a particular SCIM client 117 transmits SCIM messages to the SCIM service provider endpoint 172. Each customer may have their own SCIM service provider endpoint(s). As an example, each customer may have a/Users endpoint and a/Groups endpoint created.

The SCIM clients 117A-N each manage and store authoritative SCIM resources 116A-N, respectively. Such SCIM resources can include user SCIM resources and/or group SCIM resources. As an example, a user resource can include attributes such as a username, a name, a display name, a user type (e.g., employee, contractor), a user identifier (e.g., an employee number), a department, a time zone, a location, a list of groups in which that user belongs, one or more roles for the user, and/or one or more entities. As an example of a group resource, the group resource can include attributes such as a name of the group and a list of members of the groups. The SCIM resources 116A-N can also include custom attributes defined by the customer and/or other entities in the service. Different identity providers store different SCIM resources.

Depending on the capabilities of a particular SCIM client 117, the SCIM messages may be sent to the SCIM service provider endpoint 172 using a push method, a pull method, or a mix of both approaches. During the initial provisioning setup, the SCIM proxy service 170 may poll the SCIM clients 117A-N for all SCIM messages. If a particular SCIM client 117 supports sending SCIM messages upon a change, creation, or deletion (e.g., a new user was added, a new group was added, a user was added to a group, a user was deleted, a user was removed from a group, a group was deleted, an attribute was modified, added, deleted, etc.), that SCIM client 117 may push the periodic change, creation, or deletion to the SCIM service provider endpoint 172. In addition, or alternatively, the SCIM proxy service 170 may periodically poll the SCIM client 117 for a particular resource, such as if it has not been updated within a time-to-live (TTL) value. If a particular SCIM client 117 does not support SCIM sending messages upon a change, creation, or deletion, the SCIM proxy service 170 may poll the SCIM client 117 periodically and receive SCIM messages in response.

In an embodiment, the SCIM proxy service maintains a copy of the SCIM resources it receives from the identity providers 115A-N, shown in FIG. 1 as the SCIM resources 149. The SCIM proxy service 170 may augment the SCIM resources 149 with information from, or for, the one or more SaaS applications 130, which will be described in greater detail later herein. The maintained copy of the SCIM resources 149 can be kept in sync with the identity providers 115A-N using scheduling polling and/or SCIM resource messages pushed by the identity providers 115-N. The SCIM resources (e.g., users and/or groups) can be used by the customer when defining the requirements for accessing a particular resource and/or application of a particular SaaS application 130. An option to automatically force a user to reauthenticate if their group membership changes can also be configured by the customer.

The customer also configures one or more SaaS applications 130A-R to be connected to the identity proxy and access gateway 110 using the SaaS application configuration 160. A particular SaaS application 130 is configured such that the identity proxy and access gateway 110 is the identity provider. For instance, a SaaS application 130 is configured such that authentication requests will be sent to the identity proxy and access gateway 110. A SaaS application 130 can be a Security Assertion Markup Language (SAML) or OpenID Connect (OIDC) compliant application. If configuring a SAML SaaS application, the SaaS application configuration 160 allows the customer to configure the name of the application, an entity ID of the application (e.g., a unique URL for the SaaS application), a URL of the SaaS application's endpoint for receiving and parsing SAML assertions, and the identity format expected by the application (e.g., email). The SaaS application configuration 160 provides the SSO endpoint, the entity identifier or issuer URL, and a public key, which are to be used by the customer for configuring the identity proxy and access gateway 110 as a SSO provider for the SaaS application. If configuring an OIDC SaaS application, the SaaS application configuration 160 allows the customer to configure the attributes to include in the ID token (e.g., a unique identifier for the user, an email address, a profile, and/or group membership), the redirect URL (or callback URL) that is the endpoint where users are redirected after authenticating, and optionally enabling Proof of Key Exchange (PKCE). The SaaS application configuration 160 provides a client secret, a client identifier, a configuration endpoint, an issuer URL, a token endpoint, an authorization endpoint, a key endpoint, and a user info endpoint; which are to be used by the customer for configuring the identity proxy and access gateway 110 as a SSO provider for the SaaS application.

The one or more SaaS applications 130A-R can also be configured for SCIM with the SCIM proxy service using the application SCIM configuration 164. The SCIM proxy service 170 is configured as a SCIM client and the SaaS application is configured as a SCIM service provider. For each particular SaaS application 130, the SCIM configuration 164 allows the customer to configure the remote URL, which is the location where data is exchanged between the SCIM proxy and that SaaS application 130. The SCIM configuration 164 allows the customer to select and configure the credential compatible for the SaaS application (e.g., a bearer token, a username/password, an oauth credential). The SCIM configuration 164 may allow the customer to select the SCIM user events that are sent to the SaaS application 130, such as selecting one or more of: user create events, user update events, and user deletion events. The SCIM configuration 165 may allow the customer to select the SCIM group events that are sent to the SaaS application 130, such as selecting one or more of: group create events, group update events, and group deletion events.

The SCIM configuration 164 allows the customer to define a SCIM filter expression to match the resources to synchronize with a particular SaaS application. For instance, the filter may determine which user resource(s) and/or group resource(s) are in scope to be sent to the SaaS application. The filter expression includes at least an attribute name, an attribute operator, and optionally a value (a value may not be provided if the operator is checking for presence of an attribute). The attribute name defines the attribute to which the filter is applied. The operators can include equal, not equal, contains, starts with, ends with, has value, greater than, greater than or equal to, less than, less than or equal to, logical "and", logical "or", and "not". To provide an example, a filter expression of filter=username eq "john" will match SCIM resources only with a username of "john".

Different ones of the SaaS applications 130A-R can have different SCIM filter expressions defined for a particular customer.

The SCIM configuration 164 also allows a customer to define or configure a transformation expression for a particular SaaS application 130 to modify attribute(s) of the SCIM resources, delete attribute(s) of the SCIM resources, and/or add attribute(s) of the SCIM resources received from the identity providers 115 prior to being transmitted to the SaaS application 130. The transformation can include, for example, a change of an email address, a combination of attributes (e.g., string concatenations), and/or date-related transformations. These transformations are applied to the matching SCIM resources prior to sending to the SaaS application. The transformations may be expressed in a query transformation language. Different ones of the SaaS applications 130A-R can have different transformation expressions defined for a particular customer.

The transformation expression may be defined by the customer. In some embodiments, the SCIM configuration 164 presents an option to the customer to select one or more premade transformations. These premade transformations may be specific to a particular identity provider and the particular SaaS application. For example, a particular SaaS application may require a certain format for a particular attribute and that attribute is not in the same format at a particular identity provider. In such a case, a premade transformation may be applicable that converts the format of the attribute (or attributes) from the selected identity provider to the format of the SaaS application.

The SCIM service provider endpoint 172 receives SCIM messages from the SCIM clients 117A-N. A particular SCIM client 117 may push the SCIM messages periodically (e.g., upon a change, creation, or deletion) and/or the SCIM service provider endpoint 172 may poll the SCIM clients 117A-N for SCIM messages. These SCIM messages may include user SCIM resources and/or group SCIM resources. Example user SCIM resources include a user creation, a user update, and a user deletion. Example group SCIM resources include a group creation, a group update, and a group deletion. As illustrated in FIG. 1, the SCIM client 117A transmits the SCIM message 118A and the SCIM client 117N transmits the SCIM message 118N to the SCIM service provider endpoint 172 of the SCIM proxy service 170. The SCIM resources included in the SCIM messages may be stored as the SCIM resources 149.

The SCIM proxy service 170 processes the received SCIM messages including performing, for each configured SaaS application 130A-R for the customer, filtering and/or transforming depending on the application SCIM configuration for that SaaS application. As an example, if a SCIM filtering expression has been defined for a particular SaaS application, the SCIM filterer 173 runs the configured filtering expression to determine which, if any, SCIM resources included in the received SCIM messages are to be sent to that SaaS application. If a transformation expression has been defined for a particular SaaS application, the SCIM transformer 174 transforms the attribute(s) of the SCIM resources according to the configured transformation expression. The transformed attribute(s) may be stored in the SCIM resources 149, either replacing the original attribute or stored alongside the original attribute.

After any filtering and/or transforming, the SCIM client 176 transmits a SCIM message that includes the SCIM resources to the SCIM service provider endpoint of the SaaS application. It is possible that a SCIM message, such as the SCIM message 118A, is in scope for multiple SaaS applications. Each of the SaaS applications 130A-R that is in scope for the SCIM message can be sent a SCIM message 119, which can include the original attributes of the SCIM message 118A or include transformed attributes of the SCIM message 118A depending on the configuration of the SCIM provisioning with that SaaS application. For instance, the SCIM client 176 transmits the SCIM message 119A, which can be a transformed version of the SCIM message 118A and/or 118N (including one or more transformed attributes) or the original version of the SCIM message 118A and/or 118N, to the SCIM service provider endpoint 131A of the SaaS application 130A. Likewise, the SCIM client 176 transmits the SCIM message 119R, which can be a transformed version of the SCIM message 118A and/or 118N (including one or more transformed attributes) or the original version of the SCIM message 118A and/or 118N, to the SCIM service provider endpoint 131R of the SaaS application 130R. The SCIM client 176 may push the SCIM messages or may respond to a poll request from the SaaS application 130A-R.

It is possible that a representation of the resource already exists at one or more of the SaaS applications 130A-R. For example, a user may have been added directly to the SaaS application 130A using the functionality of the SaaS application 130A. To avoid duplication and potential conflicts, if a SCIM resource that involves creating a user or group, the SCIM proxy service 170 checks whether a representation of that SCIM resource exists at the SaaS application. Checking whether a representation of the SCIM resource exists at a particular SaaS application may include executing a correction query to resolve a matching resource at the SaaS application. Such a correlation query can be configured by the customer. If such a correlation query is specified, the SCIM proxy service 170 uses the correlation query to determine whether there is a matching resource at the SaaS application. As another example, the SCIM proxy service 170 can query the SaaS application for any unique attribute (e.g., an email address) included in the SCIM resource to determine whether there is a match. As another example, the SCIM proxy service 170 can query the SaaS application for the externalID attribute value that matches the externalID attribute value of the SCIM resource. If there is a match, the SCIM proxy service 170 adopts the resource that is used at the SaaS application. Adopting the resource may include storing an association between the resource from the IDP and the resource on the SaaS application as part of the SCIM resources 149. If there is not a match, the SCIM proxy service 170 transmits the SCIM resource to the SCIM service provider endpoint of the SaaS application.

The SaaS applications 130A-R receive the SCIM messages and can update, create, or delete the data in their identity records 132A-R accordingly.

Client devices, such as the client device 105, access resources of the SaaS applications 130A-R. The client device 105 is a computing device (e.g., laptop, desktop, smartphone, mobile phone, tablet, gaming system, set top box, internet-of-things (IoT) device, wearable device, or another network device) that can transmit and receive network traffic. The client device 105 executes a client network application 109 such as a web browser or other application that can access network resources. The client device 105 may include a gateway agent 107 that securely connects to the cloud computing network. For instance, the gateway agent 107 may establish a tunnel connection (e.g., a VPN connection) with a server that is executing the identity proxy and access gateway 110 and intercept all outgoing internet traffic or a defined subset of traffic and transmit the traffic over the tunnel to the server. The tunnel connection may be a WireGuard point-to-point tunnel or another secure tunnel such as TLS, IPsec, or HTTP/2. The gateway agent 107 may connect with the identity proxy and access gateway 110 regardless of the internet connection of the client device 105. For instance, the client device 105 may be on a public Wi-Fi network or other network not owned or controlled by the customer. The gateway agent 107 may be configured to transmit identity information of the user of the client device (e.g., an email address, a unique device identifier, a unique identifier tied to the agent, an organization identifier to which the user belongs, etc.) to the identity proxy and access gateway 110.

The customer of the system may define the requirements a user must meet to access a particular resource and/or application of the SaaS applications 130A-R. These requirements are stored in the access rules 145. These requirements may be based on identity-based access rules and/or non-identity based access rules. An identity-based access rule is based on the identity information provided by an identity provider 115 (e.g., username, email address, etc.). For instance, an identity-based access rule may define email addresses or groups of email addresses (e.g., all emails ending in @example.com) that are allowed and/or not allowed. A non-identity based access rule is a rule that is not based on identity. Examples include rules based on location (e.g., geographic region such as the country of origin), device posture, time of request, type of request, IP address, multifactor authentication status, multifactor authentication type, type of device, type of client network application, whether the request is associated with a gateway agent on the client device, and/or other layer 3, layer 4, and/or layer 7 policies.

The identity information can be provided by an identity provider 115. To determine device posture, for example, the identity proxy and access gateway 110 may access the endpoint protection provider(s) (EPP(s)) 120 to determine the posture of the client device 105. The identity proxy and access gateway 110 may determine other parameters based on the request (e.g., IP address, location, time of request, type of request, type of device and/or client network application). The identity proxy and access gateway 110 determines, based on the access rules 145 and the parameters associated with the request, whether access is allowed.

If the identity proxy and access gateway 110 determines that the user is allowed access to a particular SaaS application 130, the identity proxy and access gateway 110 transmits the user authorization to that SaaS application 130 (e.g., redirecting the client device 105 to transmit the user authorization to that SaaS application 130). That SaaS application 130 uses this information to determine whether access is allowed. Thereafter, the user may access the application provided by that SaaS application 130.

Figure 2:
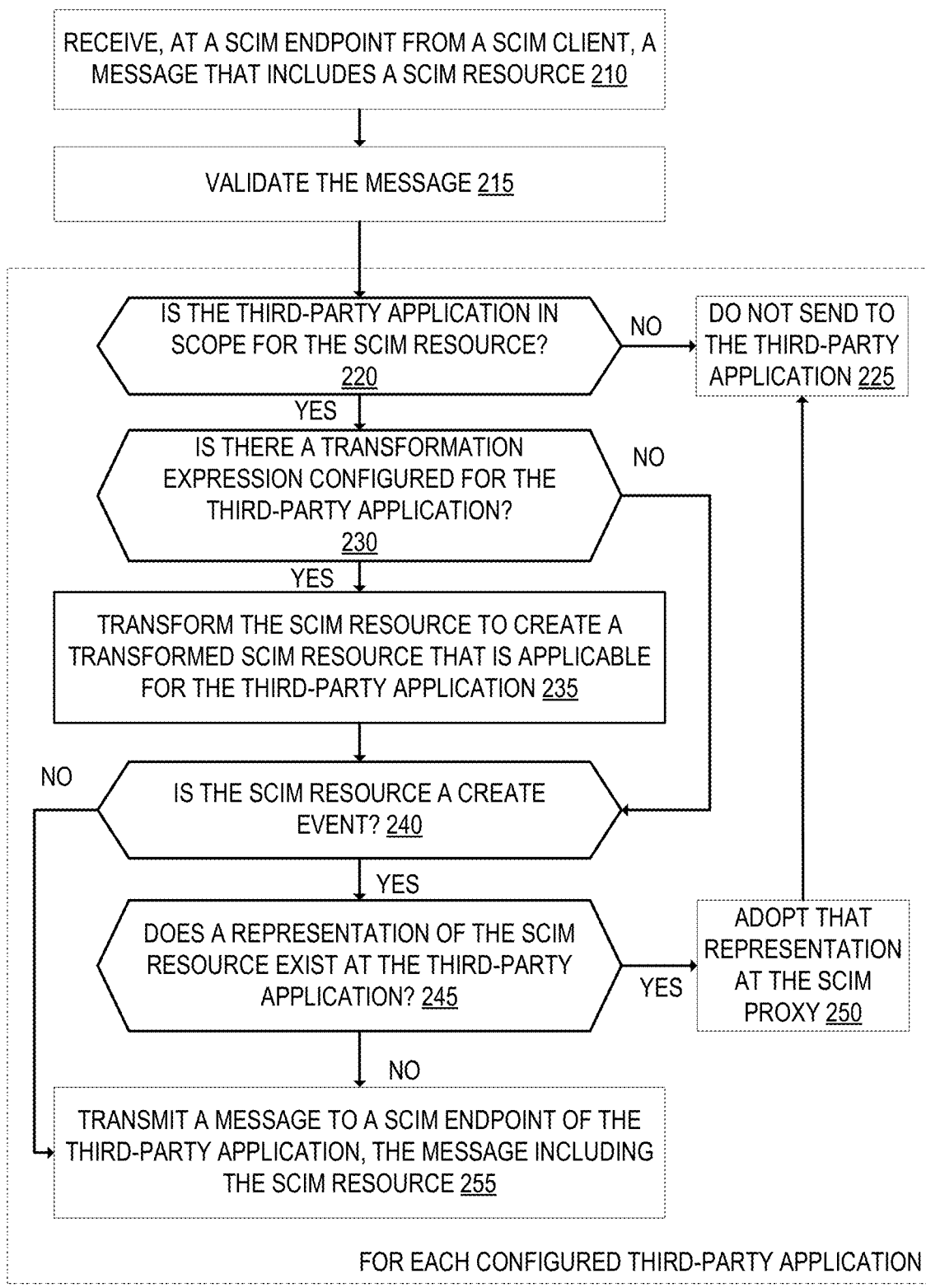
FIG. 2 is a flow diagram that illustrates exemplary operations for a SCIM proxy service according to an embodiment.

FIG. 2 is a flow diagram that illustrates exemplary operations for a SCIM proxy service according to an embodiment. The operations of FIG. 2 are described with respect to the exemplary embodiment of FIG. 1. However, the operations of FIG. 2 can be performed by different embodiments from the exemplary embodiment of FIG. 1, and the exemplary embodiment of FIG. 1 can perform operations different from FIG. 2.

At operation 210, the SCIM service provider endpoint 172 of the SCIM proxy service 170 receives a message that includes a SCIM resource. The message is received from a SCIM client, such as the SCIM client 117A on the identity provider 115A. The SCIM resource can be a user SCIM resource or a group SCIM resource. The message may be sent by the SCIM client 117A as a push message or as a result of the SCIM proxy service 170 polling the SCIM client 117A. The identity provider 115A can be the authoritative source over the SCIM resources communicated in the SCIM messages it transmits to the SCIM service provider endpoint 172.

Next, at operation 215, the SCIM proxy service 170 validates the message. Validating the message includes performing one or more of: validating a source of the message, validating a payload of the message, and validating the configuration of the SCIM client that sent the message. Validating the source of the message checks whether the message is sent from an authorized source. Validating the payload the message checks whether the actual payload is in a proper format and does not, for example, contain malicious or unexpected data. Validating the configuration of the SCIM client checks whether the message matches the SCIM provisioning configuration. If the message is valid, processing continues. If the message is not valid, then processing stops.

Although not illustrated in FIG. 2, in an embodiment, the SCIM proxy service 170 causes the SCIM resource to be locally stored (e.g., in the SCIM resources 149).

The operations 220-265 are performed for each SaaS application configured for SCIM service for the customer. At operation 220, the SCIM proxy service 170 determines whether the third-party application (e.g., the SaaS application 130A) is in scope for the SCIM resource. For example, the SCIM filterer 173 applies the configured filter(s) for the SaaS application 130A, if any, to the SCIM resource to determine whether the resource is in scope to be sent to the SaaS application 130A. If there is not a filter that is configured, the SCIM resource will be in scope. If the SCIM resource is not in scope to be sent to the SaaS application, then at operation 225 the SCIM resource is not sent to the third-party application. If the third-party application is in scope for the SCIM resource, then operation 230 is performed.

At operation 230, the SCIM proxy service 170 determines whether there is a transformation expression that is configured for the third-party application. Such a transformation expression can modify attribute(s) of the SCIM resource, delete attribute(s) of the SCIM resource, and/or add attribute(s) to the SCIM resource. Example transformations include an email address change, a combination of attributes (e.g., string concatenations), and/or date-related transformations. The transformation expression may be defined by the customer. In some embodiments, the SCIM configuration 164 presents an option to the customer to select one or more premade transformations. These premade transformations may be specific to a particular identity provider and the particular SaaS application. For example, a particular SaaS application may require a certain format for a particular attribute and that attribute is not in the same format at a particular identity provider. In such a case, a premade transformation may be applicable that converts the format of the attribute (or attributes) from the selected identity provider to the format of the SaaS application. If there is not a transformation expression that is configured for the third-party application, then operation 240 is performed. If there is a transformation expression that is configured for the third-party application, then operation 235.

At operation 235, the SCIM proxy service 170 transforms the SCIM resource according to the transformation expression to create a transformed SCIM response that is applicable for the third-party application. For example, the SCIM transformer 174 transforms one or more attributes of the SCIM resource according to the configured transformation expression for the third-party application. The transformed attribute(s) of the SCIM resource may be stored in the SCIM resources 149, either replacing the original attribute(s) or stored alongside the original attribute(s). Operation 240 is next performed.

As described earlier, it is possible that a representation of the SCIM resource already exists at the third-party application. For example, a user or group may have been added directly to the third-party application using the functionality of the third-party application. To avoid duplication and potential conflicts, the SCIM proxy service 170 checks whether a representation of that SCIM resource exists at the third-party application if the SCIM resource involves creating a user or a group. Thus, at operation 240, the SCIM proxy service 170 determines whether the SCIM resource is a create event, such as a user create event or a group create event. If it is such an event, then operation 245 is performed. If it is not such an event (e.g., it is an update event), then operation 255 is performed.

At operation 245, the SCIM proxy service 170 determines whether a representation of the SCIM exists at the third-party application. For example, if the user configured a correlation query to resolve a matching resource at the third-party application, the SCIM proxy service 170 uses the correlation query to determine whether there is a matching resource at the third-party application. As another example, the SCIM proxy service 170 can query the third-party application for any unique attribute (e.g., an email address) included in the SCIM resource to determine whether there is a match. As another example, the SCIM proxy service 170 can query the third-party application for the externalID attribute value that matches the externalID attribute value of the SCIM resource. If there is a match, then the SCIM proxy service 170 considers that a representation of the SCIM resource exists at the third-party application, and operation 250 is performed. If the SCIM proxy service 170 determines that there is not a representation of the SCIM resource that already exists at the third-party application, then operation 255 is performed.

At operation 250 (a representation of the SCIM resource has been determined to exist at the third-party application), the SCIM proxy service 170 adopts that representation of that SCIM resource. Adopting the resource may include storing an association between the resource from the IDP and the resource on the third-party application as part of the SCIM resources 149. The SCIM resource from the IDP is not transmitted to the third-party application in this case.

At operation 255, the SCIM proxy service 170 transmits the SCIM resource to the third-party application. For example, the SCIM Proxy service 170 transmits the SCIM resource, which may be the transformed SCIM resource if a transformation has been performed, to the SCIM service provider endpoint 131A.

Figure 3:
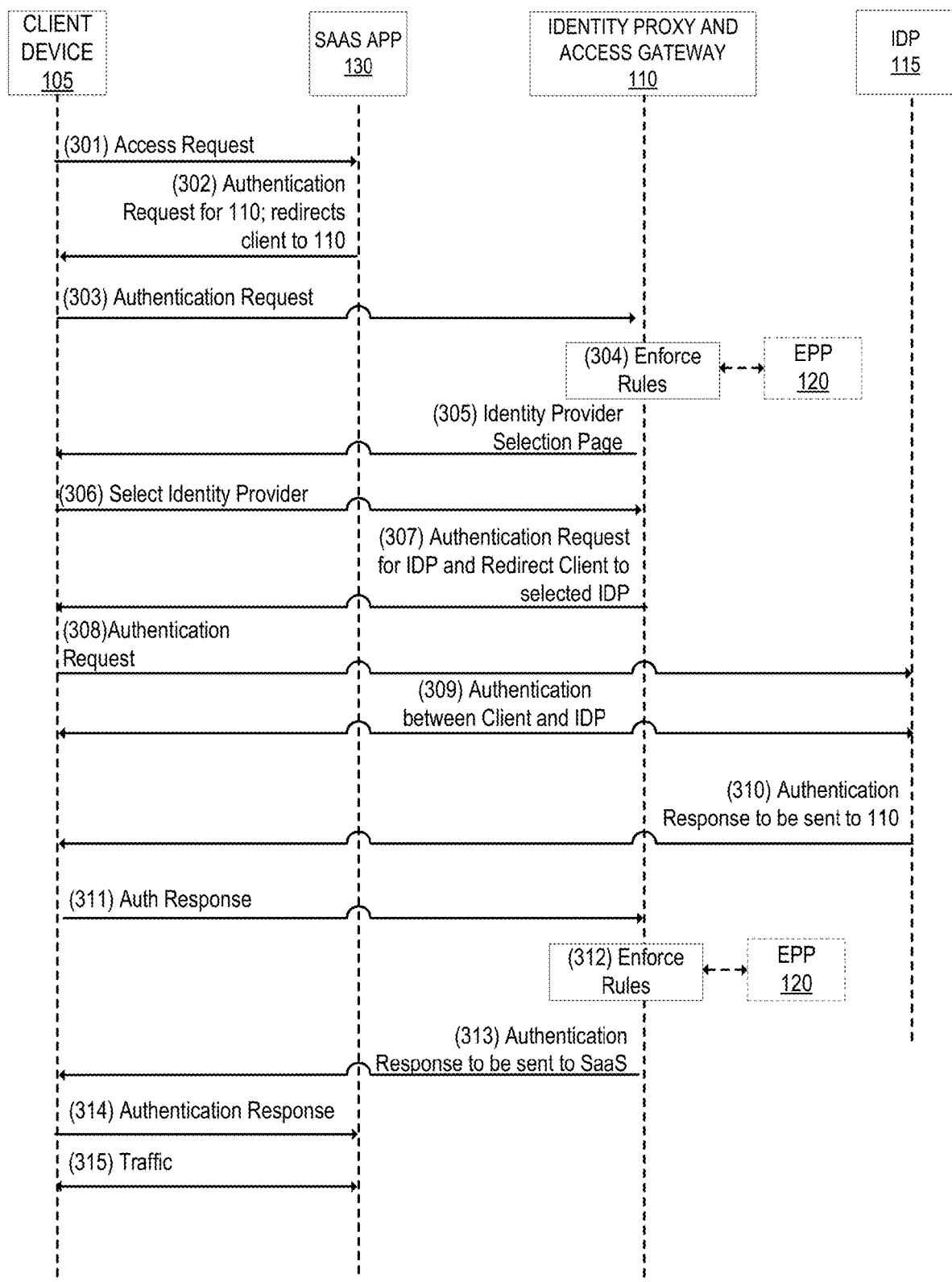
FIG. 3 is a sequence diagram that illustrates exemplary operations for an identity proxy protected with access rules according to an embodiment.

FIG. 3 is a sequence diagram that illustrates exemplary operations for an identity proxy protected with access rules according to an embodiment.

The client device 105 requests access to one of the SaaS applications 130A-R at operation 301. In the example of FIG. 3, the SaaS application 130A is used as the example SaaS application. The requested access may be a resource that is protected such that only authorized users are allowed access to the resource. For example, the requested access may be a login request to the SaaS application 130A. The SaaS application 130A is configured such that the identity proxy and access gateway 110 is the identity provider. For instance, the SaaS application 130A is configured such that authentication requests will be sent to the identity proxy and access gateway 110. The SaaS application 130A can be a Security Assertion Markup Language (SAML) or OpenID Connect (OIDC) compliant application. Thus, at operation 302, the SaaS application 130A transmits an authentication request for the identity proxy and access gateway 110 to authenticate the user requesting access and redirects the client to transmit the authentication request to the identity proxy and access gateway 110. The client device 105 transmits the authentication request to the identity proxy and access gateway at operation 303. The authentication request may be a SAML AuthnRequest.

The identity proxy and access gateway 110 receives the authentication request. Although the identity proxy and access gateway 110 is configured as the identity provider for that SaaS application 130A, in an embodiment the identity proxy and access gateway 110 does not store identity information. Instead, the identity proxy and access gateway 110 proxies the identity request with one or more identity providers 115A-N. In an embodiment, one or more identity provider(s) 115 are presented to the client device for selection, where the identity provider(s) that are presented can be configured by a customer of the system. Thus, at operation 305, the identity proxy and access gateway 110 transmits an identity provider selection page to the client device 105. The identity provider selection page includes the one or more identity provider options configured by the customer.

In an embodiment, prior to transmitting the identity provider selection page at operation 305, the identity proxy and access gateway 110 enforces a set of one or more access rules to determine whether to proceed with the login flow at operation 304. For instance, non-identity rule(s) may be configured that specify rules for accessing or not accessing the requested service. Example non-identity rules include rules based on location (e.g., geographic region such as the country of origin), device posture, time of request, type of request, IP address, multifactor authentication status, multifactor authentication type, type of device, type of client network application, and/or other layer 3, layer 4, and/or layer 7 policies. To determine device posture, for example, the identity proxy and access gateway 110 accesses the EPP(s) 120 to determine the posture of the client device 105. The identity proxy and access gateway 110 may determine other parameters based on the request (e.g., IP address, location, time of request, type of request, type of device and/or client network application).

The client device 105 receives the identity provider selection page. The identity provider selection page includes the one or more identity provider options configured by the customer. The user of the client device 105 can select one of the identity provider options. At operation 306, the identity proxy and access gateway 110 receives the identity provider selection from the client device 105.

The identity proxy and access gateway 110 generates an authentication request for the selected identity provider and redirects the client device 105 to transmit the authentication request to the selected identity provider 115 at operation 307. In this authentication request, the identity proxy and access gateway 110 essentially is taking the role of the service provider. This authentication request may be a SAML AuthnRequest. The client device receives this authentication request and transmits the authentication request to the selected identity provider at operation 308.

The client device 105 and the selected identity provider 115 then perform an authentication according to the rules and requirements at the selected identity provider 115 at operation 309. For instance, the user of the client device 105 may provide credentials (e.g., username/password) and may be required to perform multifactor authentication. In the example of FIG. 3, the user has successfully authenticated to the selected identity provider 115. As a result, at operation 310, the identity provider 115 generates and transmits an authentication response to the client device 105 that includes the user identity and optionally other metadata about the user for the client device 105 to transmit to the identity proxy and access gateway 110. The client device 105 transmits the authentication response to the identity proxy and access gateway 110 at operation 311. The authentication response message may be any type of protocol for communicating identity. For instance, the authentication response may be a SAML message, an OpenID connect (OIDC) message, or other protocol for sending identity.

The identity proxy and access gateway 110 enforces one or more access rules at operation 312. The access rule(s) enforced at operation 312 include identity-based rules and/or non-identity based rules. The identity-based rule(s) are based on the identity of the user (e.g., provided by the IDP 115) such as a username, email address, etc., and may, for example, determine whether the identified user has access rights to the requested object at the SaaS application 130A. The non-identity rule(s) are not based on the identity of the user and may, for example, specify rules for accessing or not accessing the requested service. Example non-identity rules include rules based on location (e.g., geographic region such as the country of origin), device posture, time of request, type of request, IP address, multifactor authentication status, multifactor authentication type, type of device, type of client network application, and/or other layer 3, layer 4, and/or layer 7 policies.

The identity information is provided by the selected identity provider 115 in the authentication response. To determine device posture, for example, the identity proxy and access gateway 110 accesses the EPP(s) 120 to determine the posture of the client device 105. The identity proxy and access gateway 110 may determine other parameters based on the request (e.g., IP address, location, time of request, type of request, type of device and/or client network application).

The identity of the EPP(s) 120 that are used, if any, may be configured by the customer of the system. Thus, in the example of FIG. 3, if the access rules include a rule based on device posture, the identity proxy and access gateway 110 can make a device posture call to the EPP(s) 120 to determine the posture of the client device 105. The EPP(s) determine the posture of the client device 105, which can include information such as patch status, management status, vulnerability score, etc. For instance, the EPP can determine if the client device is a healthy device and/or managed correctly as determined by configuration set at the EPP. The EPP(s) 120 transmit a device posture response to the identity proxy and access gateway 110. The response may indicate whether the client device 105 satisfies their requirements or rules (e.g., whether the client device 105 is healthy and/or compliant). An EPP 120 may be a remote server or in some cases may be an agent that is executing on the client device 105.

The identity proxy and access gateway 110 determines, based on the access rules 145, whether access is allowed. The rules and requirements are in addition to any rule or requirement of the identity provider and/or the SaaS application. FIG. 3 assumes that access is allowed. After determining that access is allowed, the identity proxy and access gateway 110 proceeds with the access flow to the SaaS application. At operation 313, the identity proxy and access gateway 110 generates and transmits an authentication response to the client device 105 that is to be sent to the SaaS application 130A. The response may include a form with information for the client device 105 to transmit to the SaaS application 130A. The authentication response may be a SAML AuthnResponse.

At operation 314, the client device 105 transmits the authentication response to the SaaS application 130A. The SaaS application 130A processes the response and allows access to the requested object. At operation 315, the client device 105 may then interact with the requested object at the SaaS application 130A.

In an embodiment, after determining that access is allowed, the identity proxy and access gateway 110 summarizes the variables used to make that decision into a standard proof of identity such as a JSON Web Token (JWT). This standard proof of identity may be signed and includes the decision (whether authorized) and information about the user. This standard proof of identity may be stored in the user's browser and can be used as proof of identity for the duration of their session. For instance, the proof of identity may include the user identity (e.g., the email address of the user), an authentication domain (e.g., the domain that signs the token), the authentication method reference (amr) values such as the multifactor authentication method used, the location (e.g., country) where the user is connecting from, the audience (e.g., the domain of the application being requested), the expiration time at which the token is no longer valid, and/or a signature that allows a receiving party to validate the message.

Some SaaS applications support JWT while others do not. For those that support JWT, the identity proxy and access gateway 110 transmits the generated JWT to the SaaS application (e.g., via a client redirection) and the user can login. For those that do not support JWT, the identity proxy and access gateway 110 converts the JWT into a standard the SaaS application supports (e.g., SAML). For instance, the authentication response transmitted in operation 313 may include a JWT if the SaaS application 130A supports JWT. If the SaaS application 130A does not support JWT, the identity proxy and access gateway 110 may convert the generated JWT to a SAML authentication response message that is transmitted in operation 313.

Figure 4:
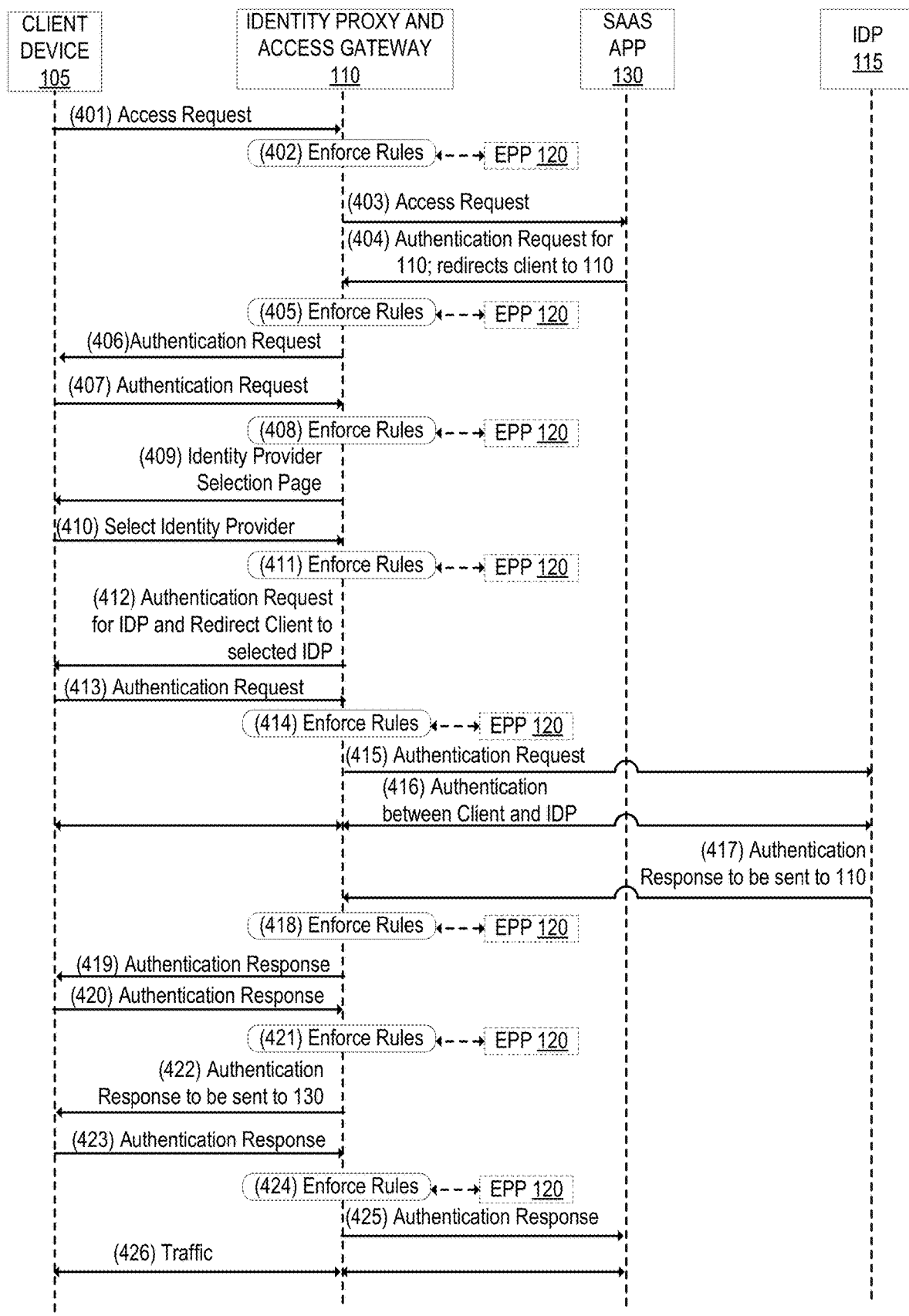
FIG. 4 is a sequence diagram that illustrates exemplary operations for an identity proxy protected with access rules according to an embodiment.

FIG. 4 is a sequence diagram that illustrates exemplary operations for an identity proxy protected with access rules according to an embodiment. In the embodiment of FIG. 4, traffic of the client device 105 is received at the identity proxy and access gateway 110. For instance, the client device 105 may be executing an agent 107 that securely connects to the identity proxy and access gateway 110. For instance, the agent 107 may establish a tunnel connection (e.g., a VPN connection) with a server that is executing the identity proxy and access gateway 110 and intercept all outgoing internet traffic or a defined subset of traffic and transmit the traffic over the tunnel to the server. The tunnel connection may be a WireGuard point-to-point tunnel or another secure tunnel such as TLS, IPsec, or HTTP/2. The agent 107 may connect with the identity proxy and access gateway 110 regardless of the internet connection of the client device 105. For instance, the client device 105 may be on a public Wi-Fi network or other network not owned or controlled by the customer. The agent 107 may be configured to transmit identity information of the user of the client device (e.g., an email address, a unique device identifier, a unique identifier tied to the agent, an organization identifier to which the user belongs, etc.) to the identity proxy and access gateway 110. As another example, the client device

105 may be on a private network belonging to the customer (e.g., an office network) where traffic is received at the identity proxy and access gateway 110. For instance, a piece of network equipment (e.g., a router) of a branch office may be configured with a GRE tunnel to the identity proxy and access gateway 110. The identity proxy and access gateway 110 may maintain an identity of the organization (e.g., the customer) associated with the tunnel.

As such, at operation 401, the client device 105 requests access to one of the SaaS applications 130A-R (e.g., the SaaS application 130A). The identity proxy and access gateway 110 may enforce a set of one or more access rules to determine whether to proceed with the login flow at operation 402. The access rule(s) enforced at operation 402 may include identity-based rule(s) (e.g., if identity is provided through an agent executing on the client device 105) and/or non-identity based rule(s). For instance, based on the identity provided by the agent 107 executing on the client device 105, an access rule may be enforced to determine whether the identified user is allowed to access the requested resource at the SaaS application 130A. Example non-identity rules include rules based on location (e.g., geographic region such as the country of origin), device posture, time of request, type of request, IP address, multifactor authentication status, multifactor authentication type, type of device, type of client network application, whether the request is associated with a gateway agent on the client device, and/or other layer 3, layer 4, and/or layer 7 policies. If an access rule checks the device posture of the client device 105, the identity proxy and access gateway 110 may access the EPP(s) 120 to determine the posture of the client device 105 as previously described herein.

If, based on the enforcement of the access rules, the request is not allowed, the identity proxy and access gateway 110 will block the request. In the example of FIG. 4, the result of enforcing the access rules in operation 402 and other rule enforcement is that the corresponding traffic is allowed. Thus, after enforcing the access rules at operation 402, the identity proxy and access gateway 110 transmits the request for access to the SaaS application 130A at operation 403.

The SaaS application 130A receives the access request. The SaaS application 130A is configured such that the identity proxy and access gateway 110 is the identity provider. For instance, the SaaS application 130A is configured such that login requests will be sent to the identity proxy and access gateway 110. The SaaS application 130A can be a Security Assertion Markup Language (SAML) or OpenID Connect (OIDC) compliant application. Thus, at operation 404, the SaaS application 130A transmits an authentication request for the identity proxy and access gateway 110 to authenticate the user requesting access and redirects the client device 105 to transmit the authentication request to the identity proxy and access gateway 110. The identity proxy and access gateway 110 may receive the request and enforce a set of one or more access rules to determine whether to proceed with the request at operation 405. The access rules may be identity based and/or non-identity based as previously described. Enforcing the access rules may include determining the device posture of the client device 105 by accessing the EPP(s) 120 as previously described. If the enforcement of the rules does not block the request, the identity proxy and access gateway 110 transmits the authentication request to the client device 105 at operation 406. The client device 105 in turn transmits the authentication request to the identity proxy and access gateway at operation 407. The authentication request may be a SAML AuthnRequest.

The identity proxy and access gateway 110 receives the authentication request. The identity proxy and access gateway 110 may enforce a set of one or more access rules to determine whether to proceed with the request at operation 408. The access rules may be identity based and/or non-identity based as previously described. Enforcing the access rules may include determining the device posture of the client device 105 by accessing the EPP(s) 120 as previously described.

Although the identity proxy and access gateway 110 is configured as the identity provider for the SaaS application 130A, in an embodiment the identity proxy and access gateway 110 does not store identity information. Instead, the identity proxy and access gateway 110 proxies the identity request with one or more identity providers 115A-N. In an embodiment, one or more identity provider(s) 115 are presented to the client device for selection, where the identity provider(s) that are presented can be configured by a customer of the system. Thus, at operation 409, the identity proxy and access gateway 110 transmits an identity provider selection page to the client device 105. The identity provider selection page includes the one or more identity provider options configured by the customer. The identity proxy and access gateway 110 may log the event.

The client device 105 receives the identity provider selection page. The identity provider selection page includes the one or more identity provider options configured by the customer. The user of the client device 105 can select one of the identity provider options. At operation 410, the identity proxy and access gateway 110 receives the identity provider selection from the client device 105. The identity proxy and access gateway 110 may enforce a set of one or more access rules to determine whether to proceed with the request at operation 411. The access rules may be identity based and/or non-identity based as previously described. Enforcing the access rules may include determining the device posture of the client device 105 by accessing the EPP(s) 120 as previously described.

The identity proxy and access gateway 110 generates an authentication request for the selected identity provider and redirects the client device 105 to transmit the authentication request to the selected identity provider 115 at operation 412. In this authentication request, the identity proxy and access gateway 110 essentially is taking the role of the service provider. This authentication request may be a SAML AuthnRequest. The client device receives this authentication request and transmits the authentication request to the selected identity provider at operation 413, which is received at the identity proxy and access gateway 110. The identity proxy and access gateway 110 may enforce a set of one or more access rules to determine whether to proceed with the request at operation 414. The access rules may be identity based and/or non-identity based as previously described. Enforcing the access rules may include determining the device posture of the client device 105 by accessing the EPP(s) 120 as previously described. The identity proxy and access gateway 110 transmits the authentication request to the selected identity provider at operation 415.

The client device 105 and the selected identity provider 115 then perform an authentication according to the rules and requirements at the selected identity provider 115 at operation 416. For instance, the user of the client device 105 may provide credentials (e.g., username/password) and may be required to perform multifactor authentication. In the example of FIG. 4, the user has successfully authenticated to the selected identity provider 115. As a result, at operation 417, the identity provider 115 generates and transmits an authentication response to the client device 105 that includes the user identity and optionally other metadata about the user for the client device 105 to transmit to the identity proxy and access gateway 110. This authentication response is received at the identity proxy and access gateway 110. The identity proxy and access gateway 110 may enforce a set of one or more access rules to determine whether to proceed at operation 418. The access rules may be identity based and/or non-identity based as previously described. Enforcing the access rules may include determining the device posture of the client device 105 by accessing the EPP(s) 120 as previously described. The identity proxy and access gateway 110 transmits the authentication response to the client device at operation 419. The client device 105 transmits the authentication response to the identity proxy and access gateway 110 at operation 420. The authentication response message may be any type of protocol for communicating identity. For instance, the authentication response may be a SAML message, an OpenID connect (OIDC) message, or other protocol for sending identity The identity proxy and access gateway 110 enforces one or more access rules at operation 421. The access rule(s) enforced at operation 421 include identity-based rules and/or non-identity based rules as previously described. Identity information is provided by the selected identity provider 115 in the authentication response as well as possibly information from the agent executing on the client device 105. Assuming that access is allowed, at operation 422, the identity proxy and access gateway 110 generates and transmits an authentication response to the client device 105 that is to be sent to the SaaS application 130A. The response may include a form with information for the client device 105 to transmit to the SaaS application 130A. The authentication response may be a SAML AuthnResponse. In an embodiment, the authentication response includes a standard proof of identity such as a JWT that includes the decision (e.g., whether authorized) and information about the user. This standard proof of identity may be stored in the client device and can be transmitted as a proof of identity for the duration of the session.

At operation 423, the client device 105 transmits the authentication response to the SaaS application 130A that is received at the identity proxy and access gateway 110. The identity proxy and access gateway 110 may enforce a set of one or more access rules to determine whether to proceed at operation 424. The access rules may be identity based and/or non-identity based as previously described. Enforcing the access rules may include determining the device posture of the client device 105 by accessing the EPP(s) 120 as previously described.

The identity proxy and access gateway 110 transmits the authentication response to the SaaS application 130A at operation 425. In an embodiment where the identity proxy and access gateway receives a standard proof of identity (e.g., JWT) from the client device 105 as the authentication response that is not supported by the SaaS application 130A, the identity proxy and access gateway 110 converts the standard proof of identity into a form the SaaS application 130A supports. For example, if the SaaS application 130A supports SAML, the identity proxy and access gateway 110 converts the standard proof of identity (e.g., the JWT) into a SAML authentication response. If the authentication response received from the client device 105 is supported by the SaaS application 130A, the authentication response can be transmitted to the SaaS application 130A without being converted. For instance, if the SaaS application 130A supports JWT, the identity proxy and access gateway 110 can transmit the generated JWT to the SaaS application 130A.

The SaaS application 130A processes the authentication response and allows access to the requested object. At operation 426, the client device 105 may then interact with the requested object at the SaaS application 130A through the identity proxy and access gateway 110.

Figure 5:
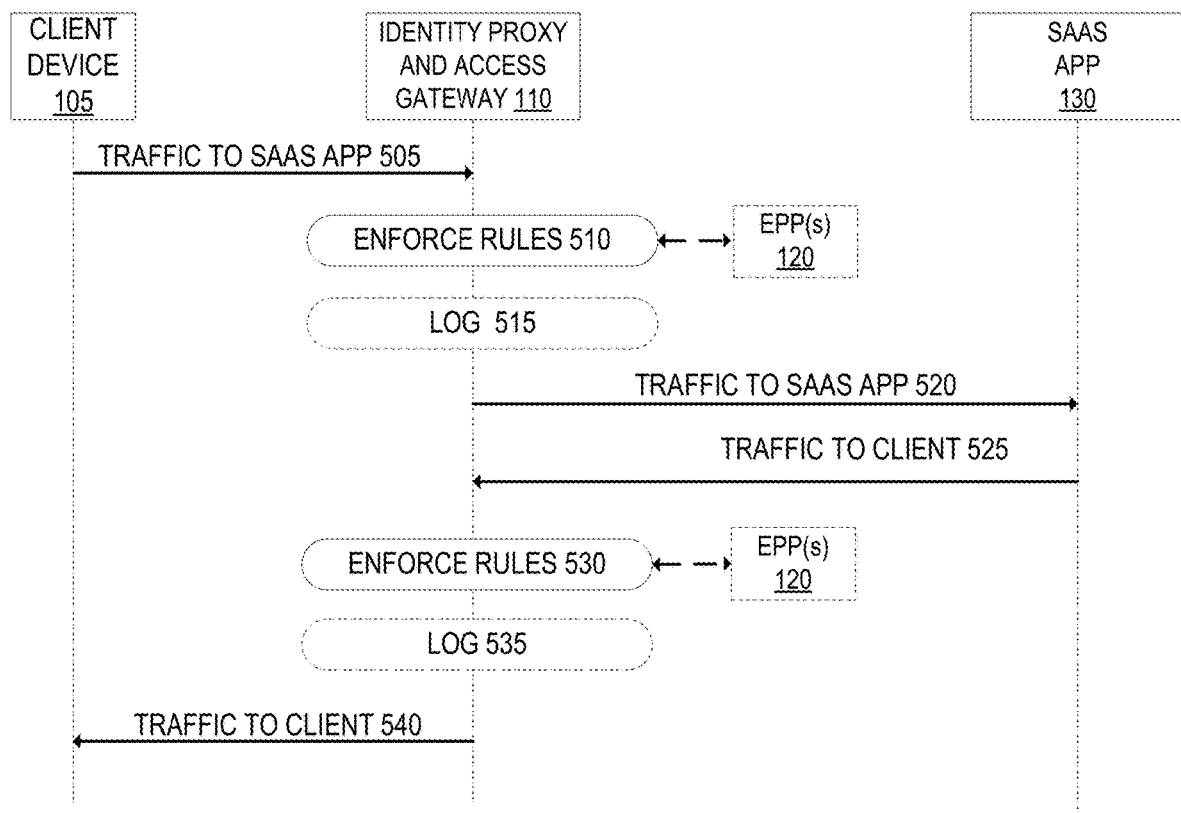
FIG. 5 is a sequence diagram that illustrates exemplary operations for the identity proxy and access gateway receiving traffic between a client device and a SaaS application according to an embodiment.

FIG. 5 is a sequence diagram that illustrates exemplary operations for the identity proxy and access gateway receiving traffic between a client device and a SaaS application according to an embodiment. The operations of FIG. 5 may occur, for example, after the user of the client device has successfully authenticated and been authorized for a SaaS application, such as through the operations of FIG. 4.

At operation 505, the client device 105 transmits traffic that is destined for one of the SaaS applications 130A-R (e.g., the SaaS application 130A). The traffic may be a request to access a particular page at the SaaS application 130A. The request may include a proof of identity such as a JWT that indicates the user has logged into the SaaS application 130A. The traffic is received at the identity proxy and access gateway 110 in a way that is like what was described with respect to FIG. 4. The identity proxy and access gateway 110 enforces a set of one or more access rules to determine whether the traffic is allowed to be transmitted to the SaaS application 130A at operation 510. The access rule(s) may include identity-based rule(s) and/or non-identity based rule(s) as previously described. As an example, the rule may specify that traffic is not allowed to be transmitted to the SaaS application 130A unless the traffic is associated with a gateway agent installed on the client device (e.g., the gateway agent 107). Enforcing the access rules may include determining the device posture of the client device 105 by accessing the EPP(s) 120 as previously described. For example, if the request is to read a resource at the SaaS application, the access rule(s) can be enforced to prevent the identified user from viewing that resource unless the access rule(s) are met (e.g., the user is authorized to view that resource). As another example, if the request is to update or add a resource to the SaaS application 130A, the access rule(s) can be enforced to prevent the identified user from updating or adding the resource to the SaaS application unless the access rule(s) are met (e.g., the user is authorized to update or add a resource to the SaaS application 130A).

Enforcing the access rule(s) may include analyzing the content of the request (e.g., if the request is uploading or updating a resource of the SaaS application 130A). For instance, the rule(s) may check for personal identifiable information, credit card numbers, data sets that contain specific information, data labels, certain keywords, or other data configured by the customer to determine whether the data can be transmitted. The data labels may be labeled with a category such as a security level category (e.g., unclassified, classified, top secret, etc.), an organization category (e.g., marketing, legal, human resources, engineering, etc.), and a location category. By way of example, a policy may be created that prevents users outside of a specific group of users from uploading a file that contains certain key phrases to any location other than a predefined location (e.g., a particular cloud storage provider).

Optionally, the identity proxy and access gateway 110 logs the request at operation 515. The logged information may identify the resource requested (e.g., the URL of the resource), the user associated with the request, the time of the request, whether the request was successful, source IP address of the request, source port of the request, destination IP address of the request, destination port of the request, etc.

The information that is logged may be different, and in some cases in addition to, the information that may be logged by the given SaaS application. For instance, the SaaS application may have its own internal logging functionality that may only log when someone successfully logs into the application; whereas the data logged by the identity proxy and access gateway service may log each request (e.g., each unique page visited) for the application in addition to when someone successfully logs into the application. Further, the logs for multiple SaaS applications can be accessed from a central location.

If the identity proxy and access gateway 110 determines that the traffic is allowed to be transmitted, then the identity proxy and access gateway 110 transmits the traffic to the SaaS application 130A at operation 520. At operation 525, the identity proxy and access gateway 110 transmits traffic to the client device 105. The traffic may be a response and include the content requested by the client in operation 505.

At operation 530, the identity proxy and access gateway 110 enforces a set of access rule(s) to determine whether access to the response is allowed. The access rule(s) may include identity-based rule(s) and/or non-identity based rule(s) as previously described and may include determining the device posture of the client device as previously described. Enforcing the access rule(s) may include analyzing the content of the requested asset. For instance, an access rule may be defined such that only certain user(s) can access a page that contains a certain keyword or certain asset. The page could be prevented from being sent to the client device or the sensitive information may be removed or redacted. This can be used to prevent sensitive data from being transmitted to the client device. As another example, the response may include a file that is labeled with a category and the access rule(s) may define the user(s) that are allowed to access files labeled with that category.

Optionally, the identity proxy and access gateway 110 logs the response at operation 535. The logged information may identify the resource requested (e.g., the URL of the resource), the user associated with the request, the time of the request, whether the request was successful, source IP address of the request, source port of the request, destination IP address of the request, destination port of the request, list of file(s) downloaded in the request, list of file(s) blocked, reason why any file(s) were blocked, etc. The information that is logged may be different, and in some cases in addition to, the information that may be logged by the given SaaS application.

If the access rule(s) are met, the identity proxy and access gateway 110 transmits the traffic to the client device 105 at operation 540.

Figure 6:
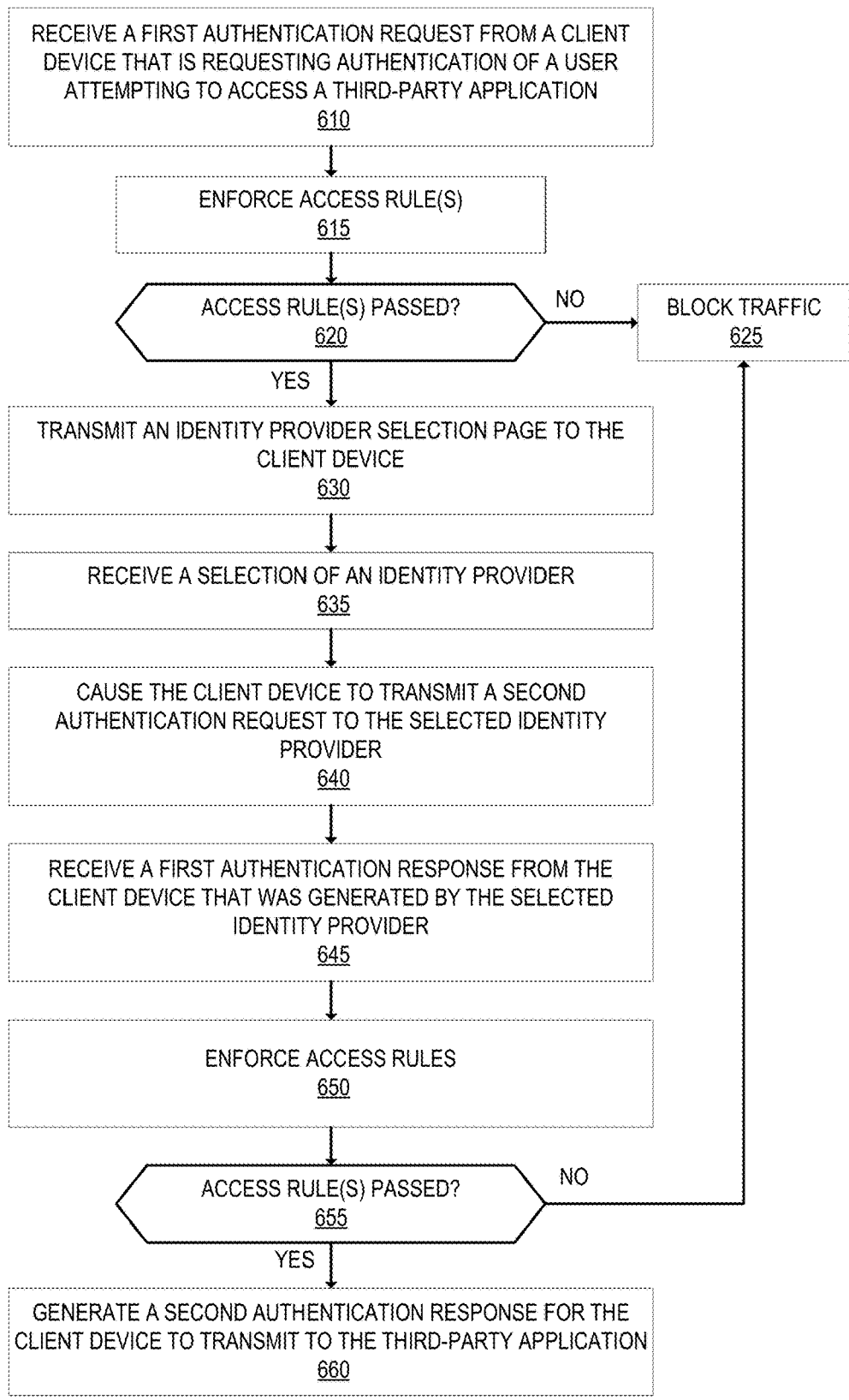
FIG. 6 is a flow diagram that illustrates exemplary operations for an identity proxy and access gateway according to an embodiment.

FIG. 6 is a flow diagram that illustrates exemplary operations for an identity proxy and access gateway according to an embodiment. At operation 610, the identity proxy and access gateway 110 receives a first authentication request from the client device 105. The first authentication request was generated by a third-party application (e.g., the SaaS application 130A). The first authentication request is requesting authentication of a user attempting to access a resource at the third-party application. The identity proxy and access gateway 110 may receive this authentication request because it is configured as an identity provider for the third-party application. The authentication request may be a SAML AuthnRequest. The identity proxy and access gateway 110 may also validate the request.

Next, at operation 615, the identity proxy and access gateway 110 enforces a set of one or more access rules to determine whether to allow or block the traffic. The access rules may include identity-based rules and/or non-identity based rules as previously described. Enforcing the access rules may include determining the device posture of the client device 105 by accessing the EPP(s) 120 as previously described. If the access rule(s) are satisfied, then operation moves from operation 620 to operation 630. If the access rule(s) are not satisfied, then operation 625 is performed where the traffic is blocked.

Although the identity proxy and access gateway 110 is configured as the identity provider for the third-party application, in the example of FIG. 6 the identity proxy and access gateway 110 cannot independently authenticate the user. Instead, the identity proxy and access gateway 110 proxies the identity request with one or more identity providers 115. In an embodiment, one or more identity provider(s) 115 are presented to the client device for selection, where the identity provider(s) that are presented can be configured by a customer of the system. Thus, at operation 630, the identity proxy and access gateway 110 transmits an identity provider selection page to the client device 105. The identity provider selection page includes the one or more identity provider options configured by the customer.

Next, at operation 635, the identity proxy and access gateway 110 receives a selection of an identity provider from the client device 105. Next, at operation 640, the identity proxy and access gateway 110 causes the client device to transmit a second authentication request to the selected identity provider 115 for authenticating the user. The identity proxy and access gateway 110 may generate the second authentication request. For this authentication request, the identity proxy and access gateway 110 essentially is taking the role of a service provider. This authentication request may be a SAML AuthnRequest. Prior to transmitting the second authentication request, the identity proxy and access gateway 110 may enforce a set of one or more access rules to determine whether to proceed with the request.

The identity provider 115 and the client device 105 perform an authentication procedure according to the rules and requirements of that identity provider 115. For instance, the user may submit login credentials to prove their identity and may be asked to perform a multifactor authentication. These rules and requirements are independent of the rules enforced by the identity proxy and access gateway 110. If the user successfully proves their identity, the identity provider 115 generates and transmits an authentication response for the client device 105 that identifies that the user has successfully authenticated to the identity provider 115. The authentication response is configured to be transmitted by the client device 105 to the identity proxy and access gateway 110 (e.g., the client device may be redirected to the identity proxy and access gateway 110). The authentication response may be a SAML AuthnResponse, an OIDC response, or other protocol for sending identity.

In an embodiment where the identity proxy and access gateway 110 does not receive all outgoing traffic from the client device 105 and all incoming traffic to the client device 105, the client device 105 receives the authentication response without the identity proxy and access gateway 110 receiving or processing the response. In an embodiment where the identity proxy and access gateway 110 receives all outgoing traffic from the client device 105 and all incoming traffic to the client device 105 (e.g., using the gateway agent 107), the authentication response is received at the identity proxy and access gateway 110. In such an embodiment, the identity proxy and access gateway 110 may enforce a set of access rules as previously described and transmit this authentication response to the client device 105 only if the set of access rules are satisfied. In either embodiment, the client device 105 is configured to transmit the authentication response to the identity proxy and access gateway 110.

At operation 645, the identity proxy and access gateway 110 receives the authentication response from the client device 105 that was generated by the selected identity provider 115. The authentication response includes the user identity and may include other metadata (e.g., one or more attributes, one or more conditions, an authorization decision).

At operation 650, the identity proxy and access gateway 110 enforces a set of access rules including identity-based rule(s) and/or non-identity based rule(s) as previously described. The identity information is provided in the authentication response as well as possibly information from the agent executing on the client device 105. Enforcing the access rules may include determining the device posture of the client device 105 by accessing the EPP(s) 120 as previously described. If the access rule(s) are satisfied, then operation moves from operation 655 to operation 660. If the access rule(s) are not satisfied, then operation 625 is performed where the traffic is blocked.

At operation 660, the identity proxy and access gateway 110 generates and transmits a second authentication response to the client device 105 that is to be sent to the third-party application (e.g., the SaaS application 130). The second authentication response indicates that the user has successfully authenticated. The second authentication response may also include other metadata. The response may include a form with information for the client device 105 to transmit to the SaaS application 130. The second authentication response may be a SAML AuthnResponse, for example.

The client device 105 receives the second authentication response. The client device 105 transmits the second authentication response to the third-party application. In an embodiment where the identity proxy and access gateway 110 does not receive all outgoing traffic from the client device 105 and all incoming traffic to the client device 105, the second authentication response is transmitted to the third-party application without first being received or processed by the identity proxy and access gateway 110. In an embodiment where the identity proxy and access gateway 110 receives all outgoing traffic from the client device 105 and all incoming traffic to the client device 105 (e.g., using the gateway agent 107), the second authentication response is received at the identity proxy and access gateway 110. In such an embodiment, the identity proxy and access gateway 110 may enforce a set of access rules as previously described and transmit the second authentication response to the third-party application only if the set of access rules are satisfied. In either embodiment, the third-party application receives the second authentication response and processes it accordingly.

Figure 7:
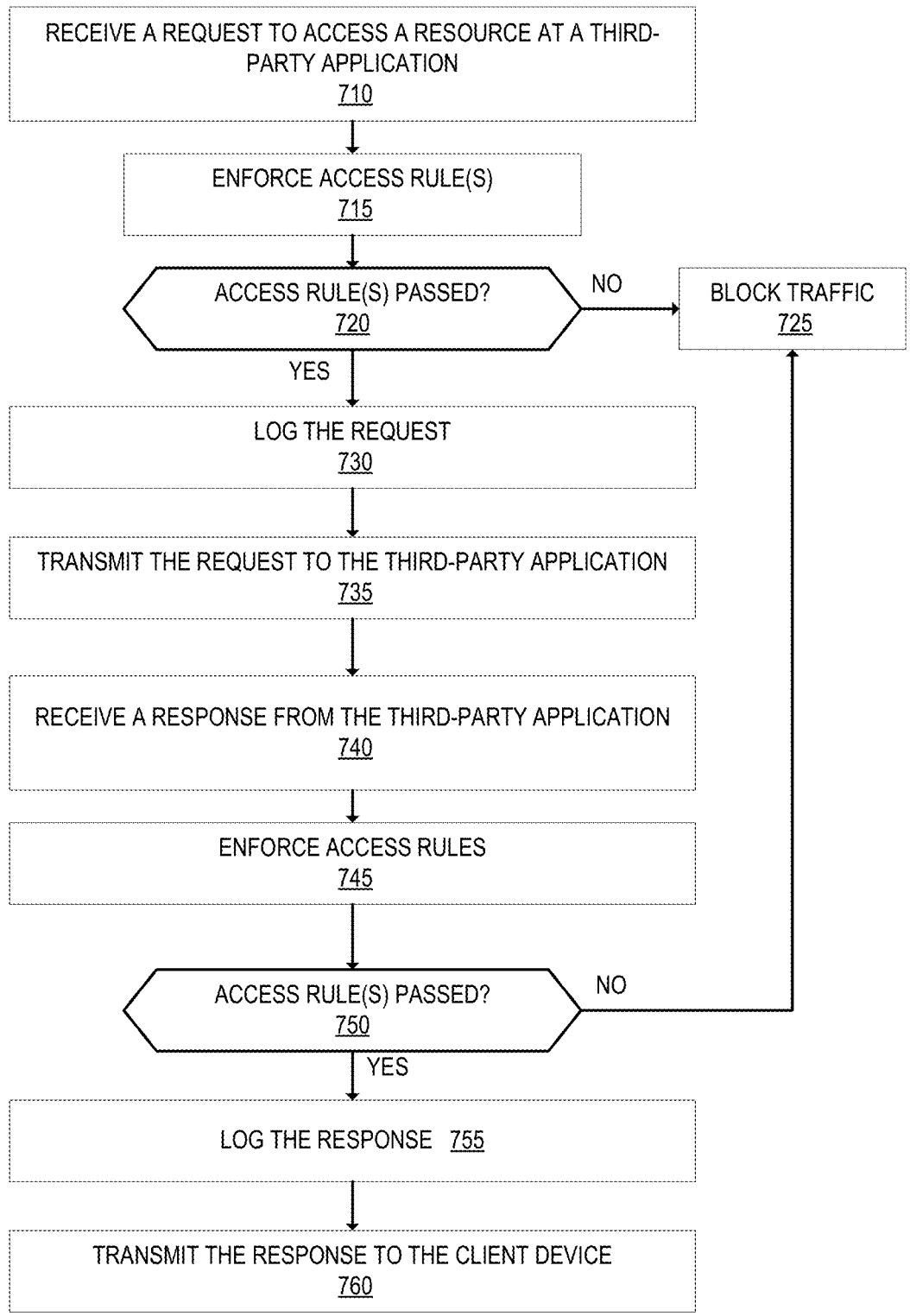
FIG. 7 is a flow diagram that illustrates exemplary operations performed at an identity proxy and access gateway according to an embodiment.

FIG. 7 is a flow diagram that illustrates exemplary operations performed at an identity proxy and access gateway according to an embodiment. The operations of FIG. 7 may be performed after a user has been successfully authenticated for access to a third-party application. At operation 710, the identity proxy and access gateway 110 receives a request to access a resource at a third-party application. The third-party application may be a SaaS application 130A, for example. The request may include a proof of identity, such as a JWT, that indicates the user identity. The request may be to read a resource (e.g., view a page) of the third-party application, update a resource of the third-party application, add a resource of the third-party application, or delete a resource of the third-party application.

At operation 715, the identity proxy and access gateway 110 enforces a set of one or more access rules to determine whether the request is allowed to be transmitted to the third-party application. The access rule(s) may include identity-based rule(s) and/or non-identity based rule(s) as previously described. As an example, the rule may specify that traffic is not allowed to be transmitted to the third-party application unless the traffic is associated with a gateway agent installed on the client device (e.g., the gateway agent 107). Enforcing the access rules may include determining the device posture of the client device 105 by accessing the EPP(s) 120 as previously described. For example, if the request is to read a resource at the third-party application, the access rule(s) can be enforced to prevent the identified user from viewing that resource unless the access rule(s) are met (e.g., the user is authorized to view that resource and meets any other requirement such as a device posture requirement). As another example, if the request is to add a resource to the third-party application, update a resource of the third-party application, or delete a resource of the third-party application, the access rule(s) can be enforced to prevent the identified user from adding, updating, or deleting respectively the resource to the third-party application unless the access rule(s) are met. The identity proxy and access gateway 110 may use the standard proof of identity (e.g., a JWT) if included in the request when enforcing the set of access rules.

Enforcing the access rule(s) may include analyzing the content of the request (e.g., if the request is uploading or updating a resource of the SaaS application 130A). For instance, the rule(s) may check for personal identifiable information, credit card numbers, data sets that contain specific information, data labels, certain keywords, or other data configured by the customer to determine whether the data can be transmitted. The data labels may be labeled with a category such as a security level category (e.g., unclassified, classified, top secret, etc.), an organization category (e.g., marketing, legal, human resources, engineering, etc.), and a location category. By way of example, a policy may be created that prevents users outside of a specific group of users from uploading a file that contains certain key phrases to any location other than a predefined location (e.g., a particular cloud storage provider).

If the access rule(s) are satisfied, then operation moves from operation 720 to operation 730. If the access rule(s) are not satisfied, then operation 725 is performed where the identity proxy and access gateway 110 blocks the traffic.

At operation 730, the identity proxy and access gateway 110 logs the request. The logged information may identify the resource requested (e.g., the URL of the resource), the user associated with the request, the time of the request, whether the request was successful, source IP address of the request, source port of the request, destination IP address of the request, destination port of the request, etc. The information that is logged may be different, and in some cases in addition to, the information that may be logged by the given third-party application. For instance, the third-party application may have its own internal logging functionality that may only log when someone successfully logs into the application; whereas the data logged by the identity proxy and access gateway service may log each request (e.g., each unique page visited) for the application in addition to when someone successfully logs into the application. Further, the logs for multiple SaaS applications can be accessed from a central location.

Next, at operation 735, the identity proxy and access gateway 110 transmits the request to the third-party application. The third-party application will receive the request and process the request accordingly. At operation 740, the identity proxy and access gateway 110 receives a response from the third-party application that is for the client device 105.

At operation 745, the identity proxy and access gateway 110 enforces a set of access rule(s) to determine whether access to the response is allowed. The access rule(s) may include identity-based rule(s) and/or non-identity based rule(s) as previously described and may include determining the device posture of the client device as previously described. Enforcing the access rule(s) may include analyzing the content of the requested asset. For instance, an access rule may be defined such that only certain user(s) can access a page that contains a certain keyword or certain asset. The page could be prevented from being sent to the client device or the sensitive information may be removed or redacted. This can be used to prevent sensitive data from being transmitted to the client device. As another example, the response may include a file that is labeled with a category and the access rule(s) may define the user(s) that are allowed to access files labeled with that category.

If the access rule(s) are satisfied, then operation moves from operation 750 to operation 755. If the access rule(s) are not satisfied, then operation 725 is performed where the identity proxy and access gateway 110 blocks the traffic.

At operation 755, the identity proxy and access gateway 110 logs the response. The logged information may identify the resource requested (e.g., the URL of the resource), the user associated with the request, the time of the request, whether the request was successful, source IP address of the request, source port of the request, destination IP address of the request, destination port of the request, list of file(s) downloaded in the request, list of file(s) blocked, reason why any file(s) were blocked, etc. The information that is logged may be different, and in some cases in addition to, the information that may be logged by the given SaaS application.

Next, at operation 760, the identity proxy and access gateway transmits the response to the client device. The operations of FIG. 7 can be performed for each request sent by the client device to the third-party application.

Figure 8:
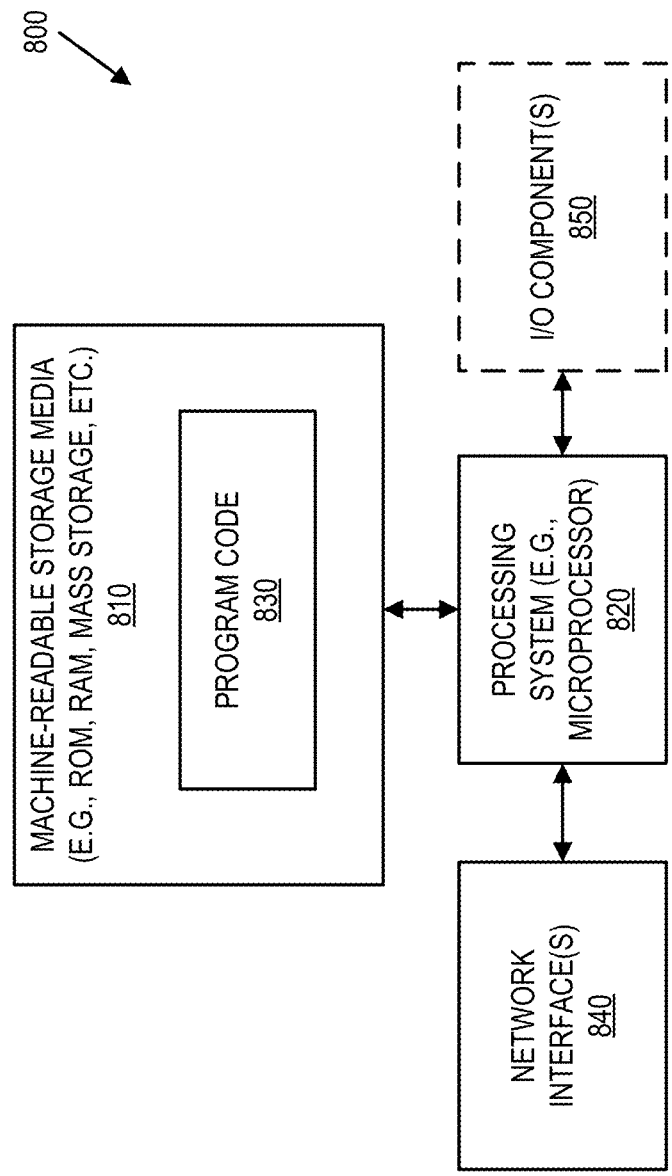
FIG. 8 illustrates a block diagram for an exemplary data processing system that may be used in some embodiments.

FIG. 8 illustrates a block diagram for an exemplary data processing system 800 that may be used in some embodiments. One or more such data processing systems 800 may be utilized to implement the embodiments and operations described with respect to the identity proxy and access gateway 110. Data processing system 800 includes a processing system 820 (e.g., one or more processors and connected system components such as multiple connected chips).

The data processing system 800 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 810 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processing system 820. For example, the depicted machine-readable storage media 810 may store program code 830 that, when executed by the processing system 820, causes the data processing system 800 to execute any of the operations described herein.

The data processing system 800 also includes one or more network interfaces 840 (e.g., a wired and/or wireless interfaces) that allows the data processing system 800 to transmit data and receive data from other computing devices, typically across one or more networks (e.g., Local Area Networks (LANs), the Internet, etc.). The data processing system 800 may also include one or more input or output ("I/O") components 850 such as a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. Additional components, not shown, may also be part of the system 800, and, in certain embodiments, fewer components than that shown in One or more buses may be used to interconnect the various components shown in FIG. 8.

The techniques shown in the figures can be implemented using code and data stored and executed on one or more electronic devices (e.g., a client device, an identity proxy and access gateway, an origin server). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

In the preceding description, numerous specific details are set forth to provide a more thorough understanding of the present invention. It will be appreciated, however, by one skilled in the art that embodiments may be practiced without such specific details. In other instances, control structures, gate level circuits and full software instruction sequences have not been shown in detail in order not to obscure embodiments. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments.

In the preceding description and the claims, the terms "coupled" and "connected," along with their derivatives, may be used. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a system for cross-domain identity management (SCIM) proxy service, comprising:
    receiving, at a first SCIM endpoint from a first SCIM client, a first message that includes a SCIM resource, wherein the first SCIM endpoint is associated with a customer of the SCIM proxy service, and wherein the SCIM proxy service is configured as a first SCIM service provider for the first SCIM client;
    validating the received first message;
    determining that a third-party application is in scope for the SCIM resource, wherein the SCIM proxy service is configured as a second SCIM client for the third-party application;
    transforming the SCIM resource to create a transformed SCIM resource that is applicable for the third-party application; and
    transmitting a second message to a second SCIM endpoint of the third-party application, the second message including the transformed SCIM resource.

2. The method of claim 1, further comprising:
    wherein the SCIM resource is a create event; and
    prior to transmitting the second message to the second SCIM endpoint of the third-party application, determining that a representation of the SCIM resource does not exist at the third-party application.

3. The method of claim 1, further comprising:
    receiving, at the first SCIM endpoint from the first SCIM client, a third message that includes a second SCIM resource, wherein the second SCIM resource is a create event;
    validating the received third message;
    determining that the third-party application is in scope for the SCIM resource;
    determining that a representation of the SCIM resource exists at the third-party application; and
    adopting the representation of the SCIM resource and not transmitting the SCIM resource to the third-party application.

4. The method of claim 1, wherein the SCIM resource includes one of a resource creation, resource modification, and resource deletion.

5. The method of claim 1, wherein validating the received first message includes one or more of: validating a source of the first message, validating a payload of the first message, and validating provisioning configuration of the first SCIM client.

6. The method of claim 1, wherein receiving the first message occurs as a result of the SCIM proxy service polling the first SCIM client.

7. The method of claim 1, wherein determining that the third-party application is in scope for the SCIM resource includes determining that the SCIM resource matches a configured filter for the third-party application.

8. A non-transitory machine-readable storage medium that provides instructions that, if executed by a processor, will cause operations for a system for cross-domain identity management (SCIM) proxy service to be performed including:
    receiving, at a first SCIM endpoint from a first SCIM client, a first message that includes a SCIM resource, wherein the first SCIM endpoint is associated with a customer of the SCIM proxy service, and wherein the SCIM proxy service is configured as a first SCIM service provider for the first SCIM client;
    validating the received first message;
    determining that a third-party application is in scope for the SCIM resource, wherein the SCIM proxy service is configured as a second SCIM client for the third-party application;
    transforming the SCIM resource to create a transformed SCIM resource that is applicable for the third-party application; and
    transmitting a second message to a second SCIM endpoint of the third-party application, the second message including the transformed SCIM resource.

9. The non-transitory machine-readable storage medium of claim 8, wherein the operations further comprise:
    wherein the SCIM resource is a create event; and
    prior to transmitting the second message to the second SCIM endpoint of the third-party application, determining that a representation of the SCIM resource does not exist at the third-party application.

10. The non-transitory machine-readable storage medium of claim 8, wherein the operations further comprise:
    receiving, at the first SCIM endpoint from the first SCIM client, a third message that includes a second SCIM resource, wherein the second SCIM resource is a create event;
    validating the received third message;
    determining that the third-party application is in scope for the SCIM resource;
    determining that a representation of the SCIM resource exists at the third-party application; and
    adopting the representation of the SCIM resource and not transmitting the SCIM resource to the third-party application.

11. The non-transitory machine-readable storage medium of claim 8, wherein the SCIM resource includes one of a resource creation, resource modification, and resource deletion.

12. The non-transitory machine-readable storage medium of claim 8, wherein validating the received first message includes one or more of: validating a source of the first message, validating a payload of the first message, and validating provisioning configuration of the first SCIM client.

13. The non-transitory machine-readable storage medium of claim 8, wherein receiving the first message occurs as a result of the SCIM proxy service polling the first SCIM client.

14. The non-transitory machine-readable storage medium of claim 8, wherein determining that the third-party application is in scope for the SCIM resource includes determining that the SCIM resource matches a configured filter for the third-party application.

15. An apparatus that provides a system for cross-domain identity management (SCIM) proxy service, comprising:
   a processing system; and
   a non-transitory machine-readable storage medium that provides instructions that, if executed by the processing system, will cause the SCIM proxy service to perform operations including:
      receiving, at a first SCIM endpoint from a first SCIM client, a first message that includes a SCIM resource, wherein the first SCIM endpoint is associated with a customer of the SCIM proxy service, and wherein the SCIM proxy service is configured as a first SCIM service provider for the first SCIM client;
      validating the received first message;
      determining that a third-party application is in scope for the SCIM resource, wherein the SCIM proxy service is configured as a second SCIM client for the third-party application;
      transforming the SCIM resource to create a transformed SCIM resource that is applicable for the third-party application; and
      transmitting a second message to a second SCIM endpoint of the third-party application, the second message including the transformed SCIM resource.

16. The apparatus of claim 15, wherein the operations further include:
   wherein the SCIM resource is a create event; and
   prior to transmitting the second message to the second SCIM endpoint of the third-party application, determining that a representation of the SCIM resource does not exist at the third-party application.

17. The apparatus of claim 15, wherein the operations further include:
   receiving, at the first SCIM endpoint from the first SCIM client, a third message that includes a second SCIM resource, wherein the second SCIM resource is a create event;
   validating the received third message;
   determining that the third-party application is in scope for the SCIM resource;
   determining that a representation of the SCIM resource exists at the third-party application; and
   adopting the representation of the SCIM resource and not transmitting the SCIM resource to the third-party application.

18. The apparatus of claim 15, wherein the SCIM resource includes one of a resource creation, resource modification, and resource deletion.

19. The apparatus of claim 15, wherein validating the received first message includes one or more of: validating a source of the first message, validating a payload of the first message, and validating provisioning configuration of the first SCIM client.

20. The apparatus of claim 15, wherein receiving the first message occurs as a result of the SCIM proxy service polling the first SCIM client.

21. The apparatus of claim 15, wherein determining that the third-party application is in scope for the SCIM resource includes determining that the SCIM resource matches a configured filter for the third-party application.

\* \* \* \* \*